United States Patent [19]

Sill

[11] Patent Number: 4,557,496
[45] Date of Patent: Dec. 10, 1985

[54] VEHICLE LIFT DEVICE FOR TOW TRUCKS

[76] Inventor: Marvin S. Sill, P.O. Box 841, 106 E. Elkhart St., Bristol, Ind. 46507

[21] Appl. No.: 560,898

[22] Filed: Dec. 14, 1983

[51] Int. Cl.⁴ .............................................. B60P 3/12
[52] U.S. Cl. .................................... 280/402; 414/563
[58] Field of Search ................. 280/402; 414/429, 563

[56] References Cited

U.S. PATENT DOCUMENTS

| 3,434,607 | 3/1969 | Nelson | 280/402 |
| 3,841,506 | 10/1974 | Smith | 414/563 |
| 4,384,817 | 5/1983 | Peterson | 414/563 |
| 4,451,193 | 5/1984 | Cannon, Jr. | 414/563 |
| 4,473,237 | 9/1984 | Lind | 280/402 |

FOREIGN PATENT DOCUMENTS 1407262  9/1975  United Kingdom ................ 280/402

OTHER PUBLICATIONS

The American Towman, (May/Jun. 1983).

Primary Examiner—Joseph F. Peters, Jr.
Assistant Examiner—Everett G. Diederiks, Jr.
Attorney, Agent, or Firm—Eugene C. Knoblock

[57] ABSTRACT

A vehicle lift device which may be easily attached to an ordinary truck for use in towing disabled vehicles. The lift device includes a frame which is secured to the truck, a telescoping beam pivotally mounted adjacent one end to the framework, and piston means secured between the framework and the beam one end for shifting the beam between a raised and lowered position. A crossbar is mounted at the other end of the beam and includes grids mounted thereon for receiving the wheels of the disabled vehicle.

1 Claim, 10 Drawing Figures

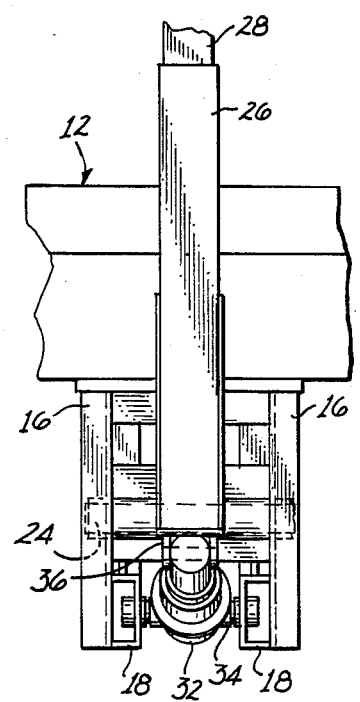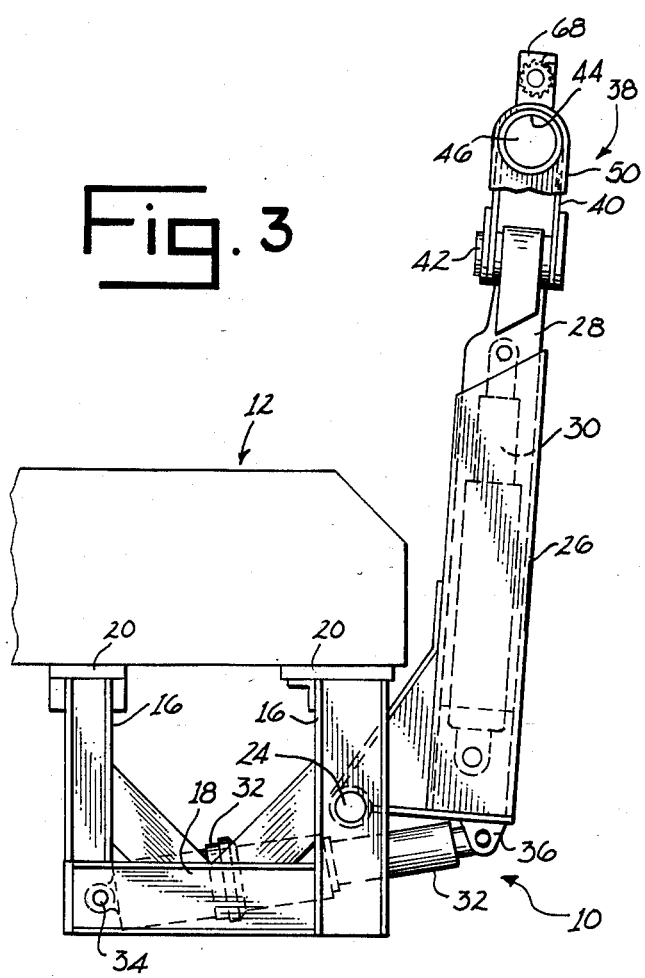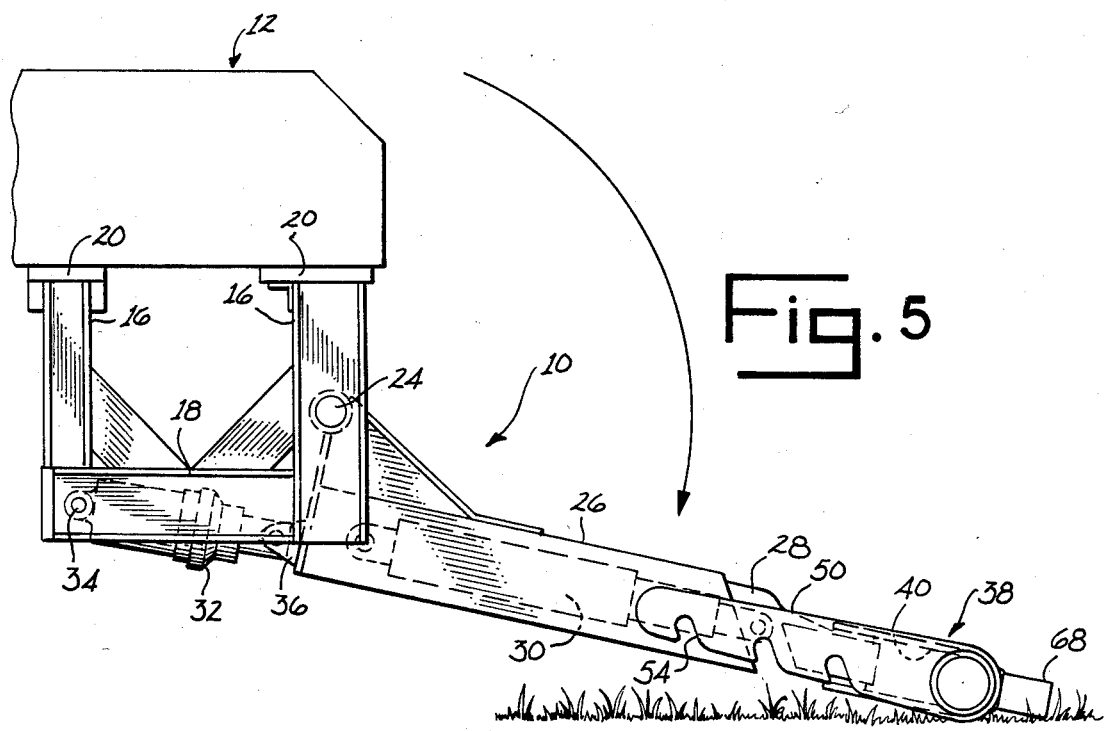
Fig. 3
Fig. 4
Fig. 5

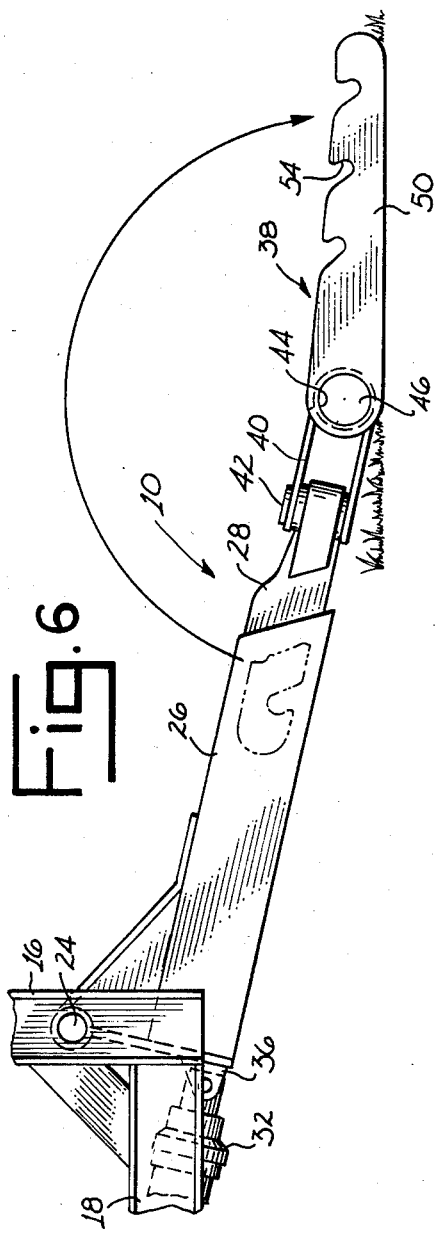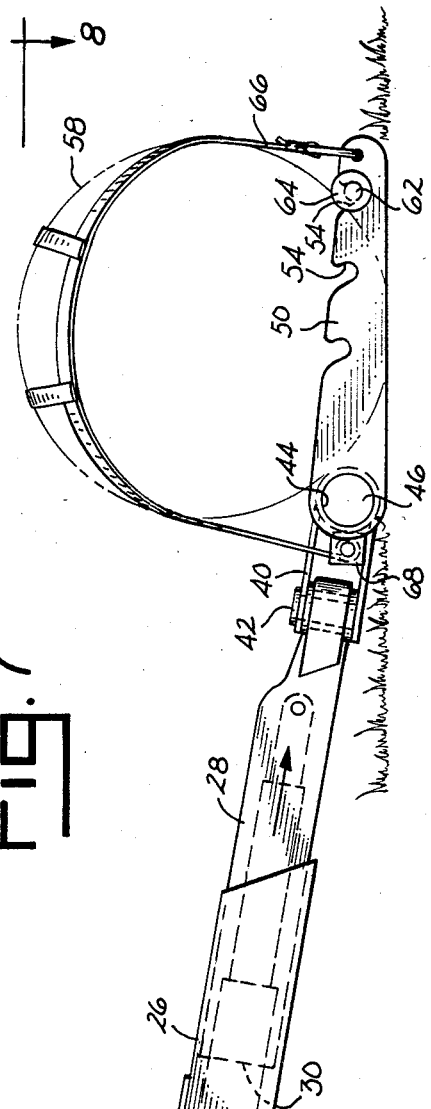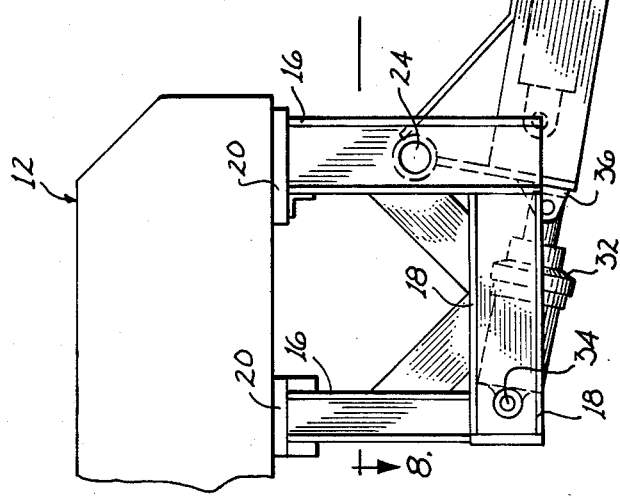

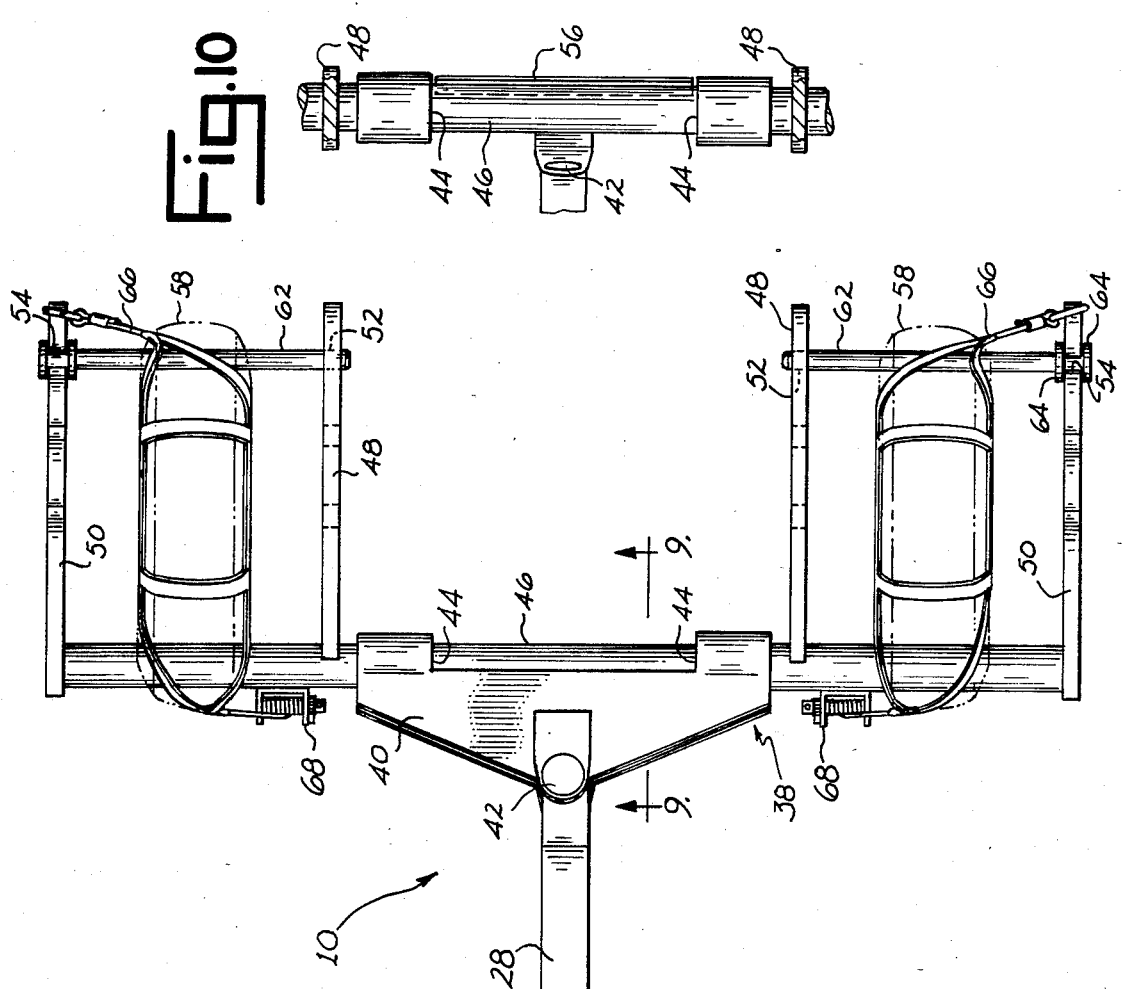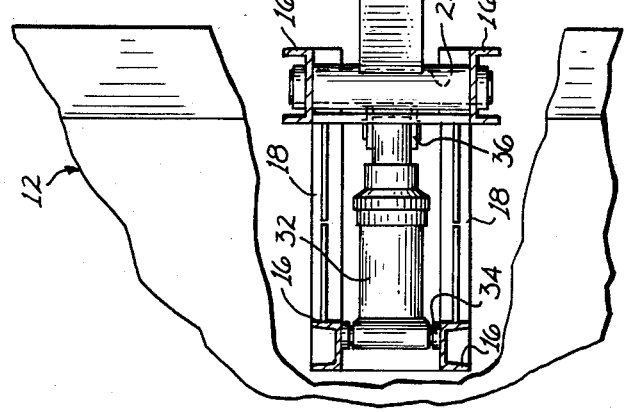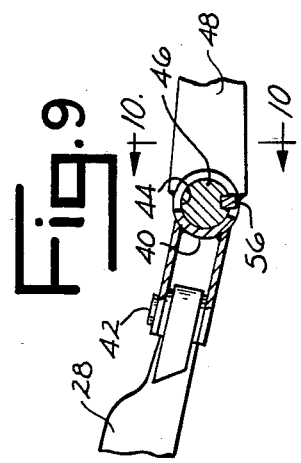

VEHICLE LIFT DEVICE FOR TOW TRUCKS

SUMMARY OF THE INVENTION

This invention relates to a vehicle lift device for tow trucks.

Prior to this time, tow trucks have been rather large vehicles with a crane type arm mounted in the bed of the vehicle and having a hoist mechanism associated therewith for lifting the end of a disabled vehicle. Such towing devices are complicated to operate and are often expensive to purchase due to the requirement of the purchase of a specially designed vehicle for use in connection therewith.

This invention is intended to provide a towing device which may be installed on an ordinary vehicle such as a pick-up truck and which is simple in its operation. The towing device of this invention includes a mounting framework which may be attached to the underside of the bed of a pick-up truck. A telescoping lift arm is pivotally attached adjacent one end to the support framework. A cylinder-piston unit is attached between the lift arm one end of the framework for raising and lowering the lift arm about its pivot point. The lift arm carries at its other end a brace which supports a lateral beam for partial rotation about its longitudinal axis. A grid is mounted at each end of the beam and is adapted to receive a wheel of a disabled vehicle for towing the vehicle. The placement of each grid into supporting contact with a wheel of the disabled vehicle includes lowering the lift arm from its upright travel position, rotating the beam about its longitudinal axis until each grid extends away from the other end of the lift arm, and extending the lift arm until a wheel is received within each grid. Retention of a wheel within the grid is accomplished through the use of a pin secured across the open end of the grid spaced from the beam such that, when the lift arm is raised, the wheel is supported upon the beam and the pin.

It is an object of this invention to provide a novel and useful vehicle lift device for towing vehicles.

Another object of this invention is to provide a vehicle lift device which may be purchased separately from a towing vehicle and which may be installed upon a vehicle, such as a pick-up truck, to convert it to a towing vehicle.

Another object is to provide a vehicle lift device which is compact and easy to operate.

Another object is to provide a vehicle lift device which enables enhanced maneuverability of the vehicle being towed. Other objects of this invention will become apparent on a reading of the following description.

BRIEF DESCRIPTION OF THE DRAWINGS

FIG. 3 is a side view showing the lift device in its raised, travel position.

FIG. 4 is a fragmentary end view of the vehicle lift device in its raised, travel position.

FIG. 5 is a side view showing the vehicle lift device in its lowered, operative position prior to the rotation of the grids to their wheel receiving position.

FIG. 6 is a side view similar to FIG. 5 showing the grids rotated to their wheel receiving position.

FIG. 7 is a side view of the vehicle lift device which illustrates extension of the lift arm and the relevant positions of a wheel of the disabled vehicle and a grid.

FIG. 8 is a top view of the vehicle lift device taken in a direction indicated by line 8—8 of FIG. 7.

FIG. 9 is a partial sectional view taken along line 9—9 of FIG. 8.

FIG. 10 is a partial end view of the vehicle lift device taken in the direction of line 10—10 of FIG. 9.

DESCRIPTION OF THE PREFERRED EMBODIMENT

Figure 1:
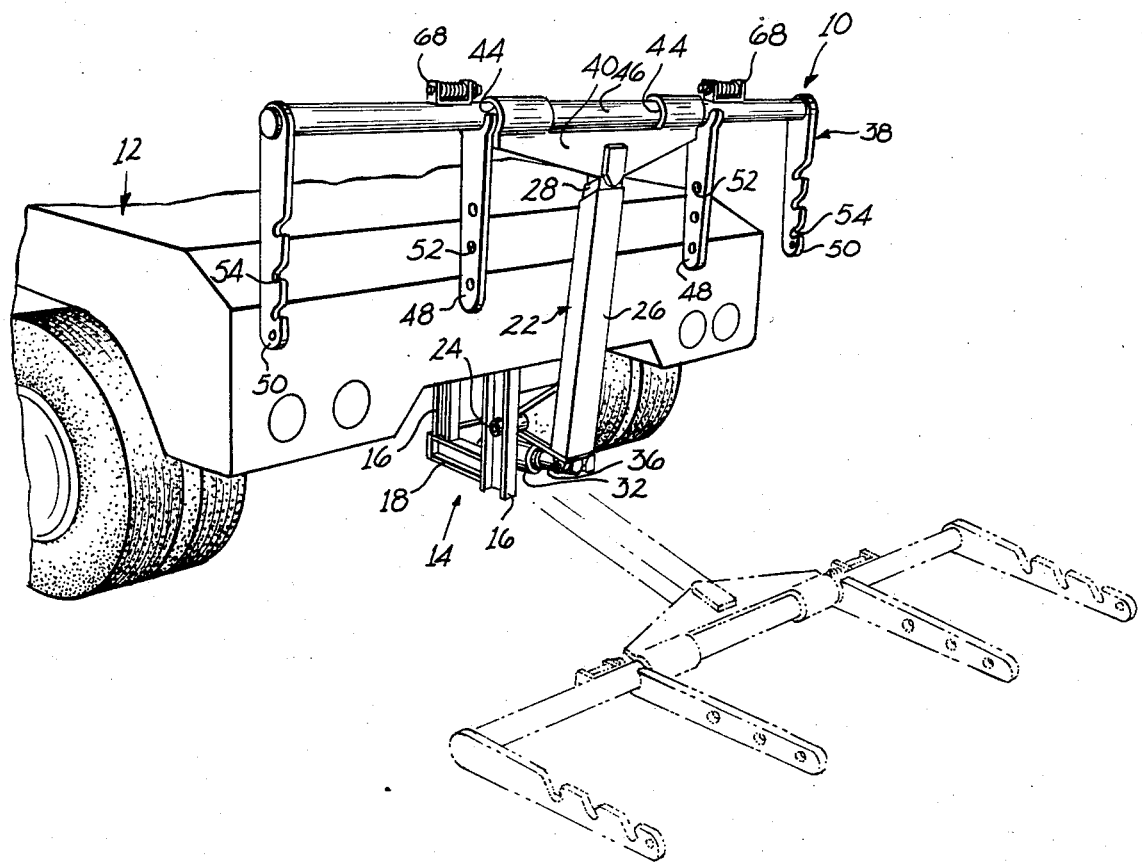
FIG. 1 is a perspective view of the lift device of this invention attached to a towing vehicle and illustrated in its inoperative, travel position in solid lines and in its operative lowered position in phantom lines.
Figure 2:
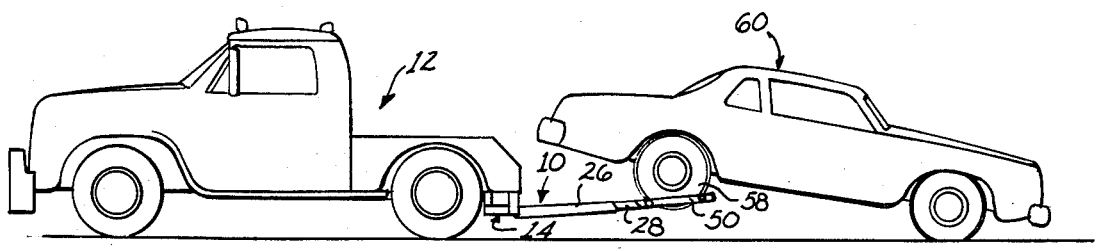
FIG. 2 is a side view showing the relevant positioning of the towing vehicle, the disabled vehicle, and the vehicle lift device during a normal towing operation.

The preferred embodiment illustrated is not intended to be exhaustive or to limit the invention to the precise form disclosed. It is chosen and described in order to explain the principles of the invention, and its application and practical use to thereby enable others skilled in the art to utilize the invention.

The lift device 10 of this invention is intended to be manufactured as a unit separate from a vehicle but which may be mounted to a vehicle such as a pick-up truck 12. Lift device 10 includes a mounting frame 14 having laterally spaced pairs of vertical members 16 joined at their lower ends by horizontal members 18. The upper ends of vertical members 16 are secured to the underside of the bed of the pick-up truck 12, such as by welding them to reinforcement plates 20. Lift device 10 includes a lift arm 22 pivotally mounted adjacent one end to a pin 24 which extends between the most rearward of the mounting frame vertical members 16. Lift arm 22 is telescoping and includes an outer arm member 26 and an inner arm member 28 which fits within the outer arm member in a slide fit. Inner and outer lift arms 26, 28 are connected by a piston-cylinder unit 30 and are extendable and retractable in relation to each other in response to activation of the piston-cylinder unit. Piston-cylinder unit 30 is preferably 2"×20" in size. A second piston-cylinder unit 32 is pivotally connected at its inner end to a pin 34 which extends between mounting frame horizontal members 18, and is pivotally connected at its outer end to a bracket 36 mounted at one end of lift arm 22. Selective activation of piston-cylinder unit 32 causes the raising and lowering of lift arm 22 between the positions illustrated in FIGS. 1–3, and 5.

A grid assembly 38 is mounted at the distal end of inner lift arm 28. Grid assembly 38 includes a brace or bracket 40 which swivels about a pin 42 at the distal end of inner lift arm 28. Bracket 40 has laterally spaced and aligned bores 44 formed therein which receive a beam 46 for rotation about its longitudinal axis. A pair of inner arms 48 and a pair of outer arms 50 are rigidly secured to beam 46. Inner arms 48 have longitudinally spaced bores 52 formed therein. Outer arms 50 have corresponding notches 54 formed therein. When lift arm 22 is in its raised, travel position, beam 46 is rotated so that arms 48,50 hang downwardly therefrom, as illustrated in FIG. 1. Beam 46 has a key 56 associated therewith between laterally spaced bracket bores 44. Key 56 bears against bracket 40, as illustrated in FIG. 9, when beam 46 and arms 48,50 are rotated so that the arms extend rearwardly from lift arm 22 when it is in its lower position. Key 56 prevents further rotation of beam 46 and arms 48,50 when lift arm 22 is elevated to the towing position illustrated in FIG. 2.

In the operation of lift device 10, lift arm 22 is normally carried in its raised, inoperative position, illustrated in FIG. 1. The engagement of grid assembly 38 with the wheels 58 of a disabled vehicle 60 is accomplished by actuating piston-cylinder unit 32 to lower the lift arm 22 to the position illustrated in FIG. 5. With the lift arm 22 in this position, arms 48,50 and beam 46 are rotated so that the arms extend rearwardly of the lift arm as illustrated in phantom line in FIG. 1, and as illustrated in FIGS. 6 and 8. With arms 48,50 in this position, inner lift arm 28 may be extended from outer lift arm 26 through the operation of piston-cylinder unit 30 to place each pair of arms 48,50 about a wheel 58. With an arm 48 and an arm 50 positioned on either side of a wheel 58, a retainer pin 62 is inserted at one end into an arm opening 52 and at its other end in a notch 54 so that when lift arm 22 is raised, the wheel will be supported upon retainer pin 62 and beam 46. Retainer pin 62 has spaced collars 64 at its other end which fit on either side of outer arm 50 for preventing longitudinal movement of the retainer pin. If desired, a strap 66 may be secured at one end to an outer arm 50 and passed upwardly over wheel 58 and secured at its outer end to a winch mechanism 68. Operation of winch mechanism 68 to tighten strap 66 over wheel 58 serves to more securely retain the wheel upon beam 46 and retainer pin 62. When vehicle wheels 58 are secured to grid assembly 38, piston-cylinder unit 32 is activated to raise lift arm 22 to the general position illustrated in FIG. 2 upon which time the disabled vehicle 60 may be towed away by vehicle 12. The swivel mounting of bracket 40 to inner lift arm 28 provides for greater maneuverability of disabled vehicle 60 during the towing operation, and is especially convenient when it is desired to operate towing vehicle 12 in a reverse motion for parking of disabled vehicle 60.

It is to be understood that this invention is not to be limited by the terms of the above description, but may be modified within the scope of the appended claims.

I claim:

1. A vehicle lift device for use in connection with the towing of a disabled vehicle by a towing vehicle, said vehicle lift device comprising frame means for mounting the vehicle lift device to said towing vehicle, a lift arm pivotally mounted to said frame means, means connected between said frame means and said lift arm for shifting the lift arm between a raised inoperative position and a lowered operative position and a towing position, a beam mounted to the distal end of said lift arm, spaced grids rigidly secured to said beam, said grids each adapted to receive a wheel of said disabled vehicle when said lift arm is in its lower operative position, whereby said disabled vehicle is raised for towing when said lift arm is raised to its towing position, said beam extending transversely of said lift arm distal end and having a bracket, said beam fitting in said bracket in a slip fit for rotational movement about its longitudinal axis, each grid including spaced inner and outer arms rigidly secured at one end to said beam, a pin removably secured across the inner and outer arms at their outer ends for supporting a said wheel of said disabled vehicle on said beam and said pin, a winch mechanism mounted to said beam, and strap means secured at one end to one of said inner and said outer arms and received at its other end in said winch mechanism for retaining a said wheel on said grid.

* * * * *